United States Patent [19]

Sharkey

[11] Patent Number: 5,026,152

[45] Date of Patent: Jun. 25, 1991

[54] ENHANCED CINEMA SYSTEM

[76] Inventor: Steven D. Sharkey, 8714 Bradmoor Dr., Bethesda, Md. 20817

[21] Appl. No.: 310,574

[22] Filed: Feb. 15, 1989

[51] Int. Cl.[5] .............................................. G03B 21/32

[52] U.S. Cl. ........................................ 352/85; 352/43; 352/86; 350/117

[58] Field of Search ............................ 352/43, 85, 86; 350/117

[56] References Cited

U.S. PATENT DOCUMENTS

| | | |
|---|---|---|
| Re. 30,278 | 5/1980 | Stumpf et al. . |
| Re. 32,341 | 1/1987 | Smith . |
| 1,210,960 | 1/1917 | McCormick . |
| 1,256,147 | 2/1918 | McCormick . |
| 1,281,720 | 10/1918 | Tully . |
| 1,406,663 | 2/1922 | Lovstrom . |
| 1,747,377 | 2/1930 | Maxon . |
| 1,754,674 | 4/1930 | Farnum . |
| 1,835,642 | 12/1931 | Friedland . |
| 1,885,642 | 11/1932 | Strong . |
| 1,964,591 | 6/1934 | Nanfeldt . |
| 2,016,467 | 10/1935 | von Toll . |
| 2,026,437 | 12/1935 | Rosenberg . |
| 2,117,857 | 5/1938 | Schlanger et al. . |
| 2,281,047 | 4/1942 | Pennow . |
| 2,383,493 | 8/1945 | Mercer . |
| 2,540,144 | 2/1951 | Stern .................................... 352/85 |
| 2,558,660 | 6/1951 | Mullen . |
| 2,705,278 | 3/1955 | Pratt . |
| 2,717,530 | 9/1955 | Morphis et al. . |
| 2,783,366 | 2/1957 | Jellinek et al. . |
| 2,821,393 | 1/1958 | Hoppe . |
| 2,920,240 | 1/1960 | Macklem . |
| 2,994,804 | 8/1961 | Skirpan . |
| 3,035,836 | 5/1962 | McGulley . |
| 3,048,075 | 8/1962 | Wright . |
| 3,085,470 | 4/1963 | Berger . |
| 3,163,949 | 1/1965 | Gley . |
| 3,259,386 | 7/1966 | Rush . |
| 3,328,803 | 6/1967 | Schwerin . |
| 3,469,837 | 9/1969 | Heilig . |
| 3,502,400 | 3/1970 | Schlanger . |
| 3,514,670 | 5/1970 | Isaacs . |
| 3,530,462 | 9/1970 | Hampel . |
| 3,550,112 | 12/1970 | Schulenberg et al. . |
| 3,555,351 | 1/1971 | Sherwin . |
| 3,561,850 | 2/1971 | Shaffer . |
| 3,578,852 | 5/1971 | Aldridge . |
| 3,588,237 | 6/1971 | Aldrich . |
| 3,606,517 | 9/1971 | Jacobson et al. . |

(List continued on next page.)

FOREIGN PATENT DOCUMENTS

| | | |
|---|---|---|
| 569541 | 7/1958 | Belgium . |
| 78245 | 10/1893 | Fed. Rep. of Germany ...... 350/117 |
| 429860 | 7/1911 | France ................................ 350/117 |
| WO85/01175 | 3/1985 | World Int. Prop. O. . |

OTHER PUBLICATIONS

INC. of Jan. 1989; entitled, "The Littlest Mogul", Victor Alexander Steve D. Sharkey, Personal Statement, dated May 1, 1989.

Inc., Jan. 1990, "Light Show", p. 20.

Capt. Eo Show, Walt Disney World, Epcot Center.

*Primary Examiner*—Monroe H. Hayes
*Attorney, Agent, or Firm*—David B. Newman, Jr. & Associates

[57] ABSTRACT

An enhanced cinema system for use with a movie screen using a fog-like gas released from a plurality of retractable shafts having slits. The plurality of shafts may spin to generate a fog effect with the fog-like gas escaping from the slits. A movie projector may project a movie onto the movie screen, and signals may cause a laser beam of light to interact with the movie and fog-like gas in front of the movie screen. Programmable lighting panels may be mounted on the side walls of the movie theater and in response to a lighting signal from the movie projector, activate lights in the programmable lighting panels during a movie. The enhanced cinema system may further include a remote location coupled to the enhanced cinemas, for distributing programs through a communications channel or other medium, for having a globally controlled system for various movies and effects.

35 Claims, 4 Drawing Sheets

U.S. PATENT DOCUMENTS 3,609,020 9/1971 Kelly .
3,609,020 9/1971 Kelly .
3,610,745 10/1971 Wilson .
3,623,066 11/1971 Norris .
3,638,009 1/1972 Strianese .
3,639,046 2/1972 Boudouris et al. .
3,640,611 2/1972 Boudouris et al. .
3,643,217 2/1972 Morphew et al. .
3,684,358 8/1972 Boudouris et al. .
3,710,090 1/1973 Shea et al. .
3,718,388 2/1973 Boudouris et al. .
3,755,663 8/1973 George, Jr. .
3,757,106 9/1973 Bau et al. .
3,783,263 1/1974 Cruse .
3,784,811 1/1974 Feder .
3,805,049 4/1974 Frank et al. .
3,869,699 3/1975 Haller et al. .
3,898,643 8/1975 Ettlinger .
3,909,822 9/1975 Lee et al. .
3,973,839 8/1976 Stumpf et al. .
4,006,970 2/1977 Slater et al. .
4,060,915 12/1977 Conway .
4,110,017 8/1978 McCormack et al. .
4,112,486 9/1978 Tovi .
4,131,345 12/1978 Carollo .
4,134,132 1/1979 Magos et al. .
4,160,285 7/1979 Shibla .
4,196,461 4/1980 Geary .
4,223,374 9/1980 Kimmel .
4,252,311 2/1981 Torricelli .
4,264,845 4/1981 Bednarz .
4,271,408 6/1981 Teshima et al. .
4,283,659 8/1981 Beckerman et al. .
4,336,484 6/1982 Smith .
4,338,547 7/1982 McCaslin .
4,339,789 7/1982 Husby et al. .
4,355,348 10/1982 Williams .
4,385,814 5/1983 Elliott .
4,392,187 7/1983 Bornhorst .
4,496,946 1/1985 Pera .
4,593,234 6/1986 Yang .
4,602,321 7/1986 Bornhorst .
4,603,030 7/1986 McCarthy .
4,628,422 12/1986 Ewald .
4,639,841 1/1987 Salestrom et al. .
4,656,567 4/1987 Morris .
4,661,891 4/1987 Kitamura .
4,694,381 9/1987 Dedoro .
4,695,953 9/1987 Blair et al. .
4,697,227 9/1987 Callahan .
4,711,543 12/1987 Blair et al. .
4,716,344 12/1987 Newell et al. .
4,717,343 1/1988 Densky .
4,720,709 1/1988 Imamura et al. .
4,745,531 5/1988 LeClercq .
4,771,278 9/1988 Pooley .
4,779,176 10/1988 Bornhorst .

ENHANCED CINEMA SYSTEM

BACKGROUND OF THE INVENTION

This invention relates to the exhibition of movies in public movie theaters/cinemas, and more particularly to an enhanced cinema system with special features that heighten the entertainment, theatrical and artistic experience of viewers. The enhanced cinema system additionally may be used for advertisement within movie theaters.

DESCRIPTION OF THE PRIOR ART

Movie systems can be categorized in the areas of: projection, sound and screen systems/apparatus, and movie theater auditorium designs. Prior art in these various areas include three dimensional (3-D) movies, cinerama, panorama, holographic movie projection and optical systems, experience theater, audience seated on moving platforms, scent-emitting systems, audience reaction measuring devices, motion picture projection and control systems, daylight and rear screen projection systems and enhanced sound systems. 3-D, cinerama and panorama systems require special camera equipment and processes for filming a 3-D movie or cinerama or panorama movie, which increases movie production costs and investment. Special theaters and projection systems are required for viewing cinerama or panorama movies, and special viewing glasses are required for watching 3-D movies.

In the prior art, methods and apparatus have been proposed for interactively controlling television by a viewer, as disclosed in U.S. Pat. No. 4,695,953 issued to Blair et al. and U.S. Pat. No. 4,711,953 issued to Blair et al. These prior art patents teach an animation method which enables rapid and repeated switching of multiple tracks of different camera originated animation of the same character during continuous action in a scene. An embodiment of the disclosed patents shows how a player can swing a racket before a screen or television monitor, hit a midair projected image of a perspective ball animated action, return the ball back to an animated character opponent, and play a simulated game.

Other prior art systems include video games which enable players to control video images via buttons, knobs, and control sticks or wheels. All such prior art systems involve interaction with video game or television displays. To date, there have been no disclosure of methods or apparatus for interacting with a movie or cinema, so as to create visual special effects, apart from the movie.

U.S. Pat. No. 1,281,720, issued to Tully, discloses a method of producing a fog, haze or smoke, across a stage, by illuminating a screen stretched in front of the stage. This patent does not teach or suggest using actual fog-like gas to generate the fog, haze or smoke.

None of the prior art systems teach or suggest providing a cinema viewing audience a unique visual experience based on special external effects to a movie film or advertisement.

OBJECTS AND SUMMARY OF THE INVENTION

An object of the present invention is to provide special effects and other new technologies to movie theaters.

Another object of the present invention is to enhance the pleasure of viewing movies in theaters and thereby giving audiences added entertainment value when viewing movies.

A further object of the invention is to provide an interactive system of movie and special effects.

A still further object of the invention is to provide an enhanced cinema system with an interactive effect of a laser light beam of theatrical quality and a display of fog-like gas in front of the movie screen.

An additional object of the invention is to provide an enhanced cinema system having gases rolling across and in front of a movie screen.

An additional object of the invention is to provide an enhanced cinema system with an interactive effect between three aspects of the system: 1) laser light beams; 2) a display of gases rolling in front of the screen; and, 3) banks of lights on the walls of the theater auditorium. All of these in turn could interact with the movie being projected.

Another object of the present invention is to provide an educational and learning method by which a movie viewing audience may absorb more of the artistic subtleties, messages or meanings of the film being viewed.

An additional object of the invention is to provide an enhanced cinema experience for the full spectrum of the movie public, from the serious minded viewer looking for message, meaning or insights to the viewer desiring entertainment, thrills and novel experiences.

According to the present invention, as embodied and broadly described herein, an enhanced cinema system is provided that interacts with a conventional movie system comprising a screen, sound system, means for generating a fog-like gas, movie means, control means, and a screen-fogging apparatus having a plurality of retractable shafts, means for spinning the shafts, and means for advancing the shafts across the screen. The means for generating a fog-like gas may be embodied as a fog generator. The plurality of retractable shafts have slits, are mounted in front of the movie screen and are coupled to the fog-like gas generating means. The means for spinning the shafts may be embodied as a motor and chain drive connected to the shafts. The spinning means are coupled to the plurality of shafts for spinning the plurality of shafts. The fog-like gas flows from the generating means through the plurality of shafts and escapes from the slits of the plurality of shafts. The movie means may be embodied as a movie projector or any other apparatus capable of projecting a movie onto a movie screen. The movie means also is responsive to a movie film for generating an interact signal and a lighting signal. A laser or other means for generating a beam of light is coupled to the movie means and control means, and is responsive to the interact signal from either the movie means or control means for generating a beam of light. The beam of light interacts with the movie, screen-fogging apparatus, or programmable lighting panels.

The enhanced cinema system further includes programmable lighting panels having a plurality of lights. The programmable lighting panels are mounted on the side walls of the cinema. Control means is coupled to the programmable lighting panels, and movie means. The control means may be embodied as a computer or other processor apparatus. In response to the lighting signal generated by either the movie means or by the control means, the control means activates the lights in the programmable lighting panels before, during or after the movie. The invention can further include means for remotely controlling and distributing the special effects to be viewed to a plurality of cinemas.

Additional objects and advantages of the invention will be set forth in part in the description which follows, and in part will be obvious from the description, or may be learned by practice of the invention.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

DETAILED DESCRIPTION OF THE PREFERRED EMBODIMENTS

Reference will now be made to the present preferred embodiments of the invention, examples of which are illustrated in the accompanying drawings wherein like numerals indicate like elements throughout the several views.

Figure 1:
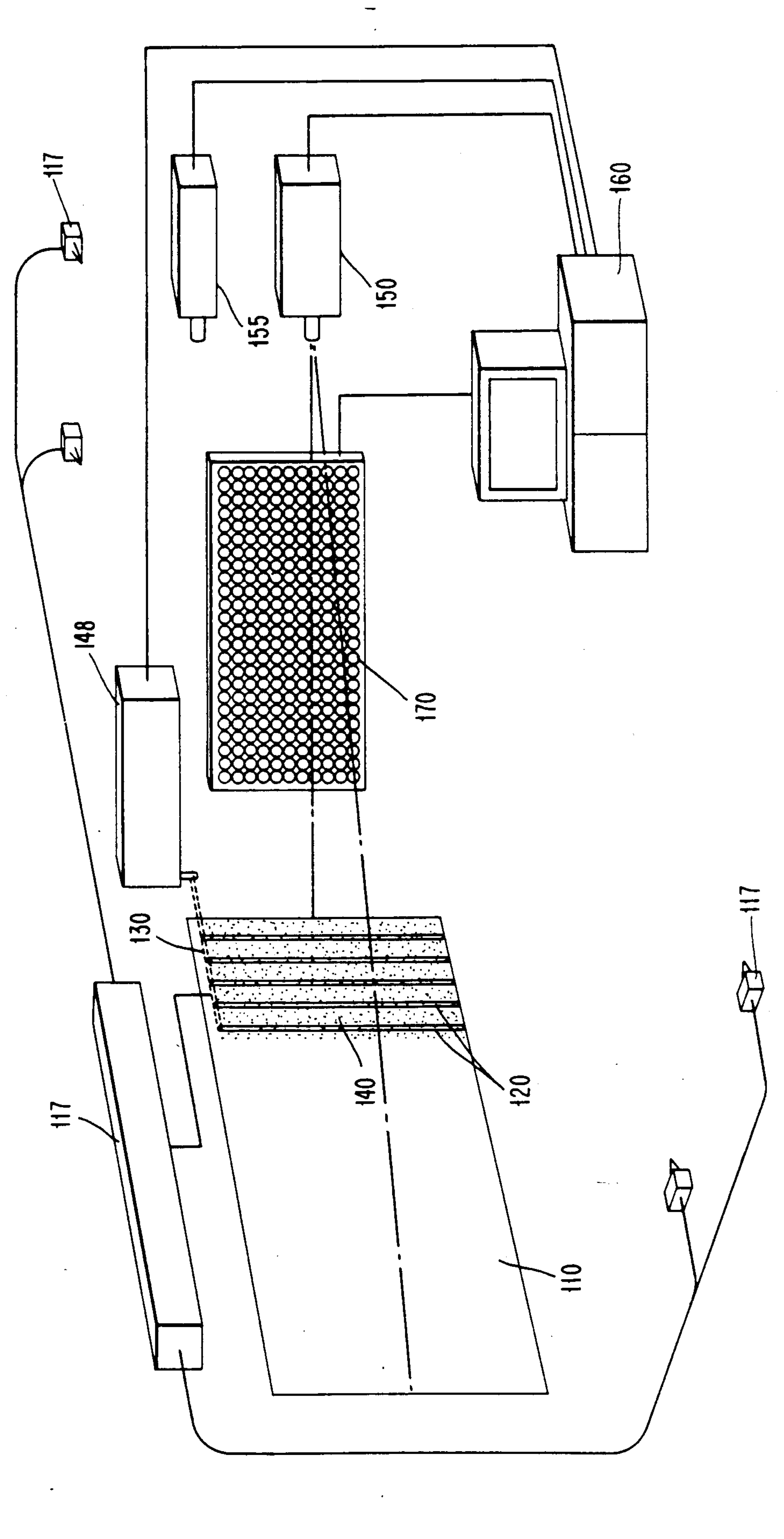
FIG. 1 is a diagram of an enhanced cinema system according to the present invention.

FIG. 1 illustratively shows an enhanced cinema system. As shown in FIG. 1, screen fogging means embodied as a screen fogging apparatus including means for generating a fog-like gas is mounted in front of movie screen 110. Movie means, embodied as movie projector 150, projects a movie onto the fog-like gas 140 and/or onto the movie screen 110. Means for generating a beam of light is shown embodied as a laser 155. The laser includes all elements necessary for generating and moving a laser beam onto and across the movie screen 110. The laser 155, screen-fogging controller 148, and the movie projector 150 are coupled to control means. The control means may be embodied as computer 160. Also depicted in FIG. 1 is programmable lighting panel 170, which is coupled to computer 160.

The movie projector 150 is responsive to a movie film for generating an interact signal and a lighting signal. The laser 155 is coupled to the movie projector 150 through the computer 160, and generates a beam of light in response to the interact signal. The beam of light interacts with the movie and screen fogging apparatus in front of the movie screen 110.

As shown in FIG. 1, programmable lighting panels 170 include a plurality of lights. The programmable lighting panels 170 are mounted on the side walls of the cinema. The computer 160 is coupled to the programmable lighting panels 170 and to the movie projector 150. In response to the lighting signal from the movie projector 150, the computer 160 activates the lights in the programmable lighting panels 170 during the movie. The computer 160 may also be programmed to drive the programmable lighting panels independently of the movie projector 150 for controlling light and sound shows before or after the movie.

The programmable lighting panels 170 are a plurality of lights that cover the walls of the movie theater auditorium from top to bottom, from the front to the rear of the theater. The programmable lighting panels 170 can be programmed to interact with the film being shown, with trailers, and with any type of light and sound shows before or after the film, or with any other enhancements for theatrical effects.

The laser 155 can interact with the screen-fogging apparatus which generates fog which is rolling across the screen 110. In a simplified example, before a movie is shown the shafts 120 can be drawn across the screen which will cause the fog-like gas 140 to roll across the screen. Simultaneously, the laser 155 can appear as a bright beam of light of variable color sweeping the fog-like gas 140 across and/or off the screen. Before the laser beam would strike the screen, the means for generating a fog-like gas which may include remote fog emitting devices that are deployed effectively in the theater auditorium would inject a harmless gas or vapor in the area of the theater through which the laser or other light beam would pass. This would be done to ensure that the light beam is visible and appears as a bold shaft of light striking or crashing into the screen or other areas of the auditorium.

Figure 2:
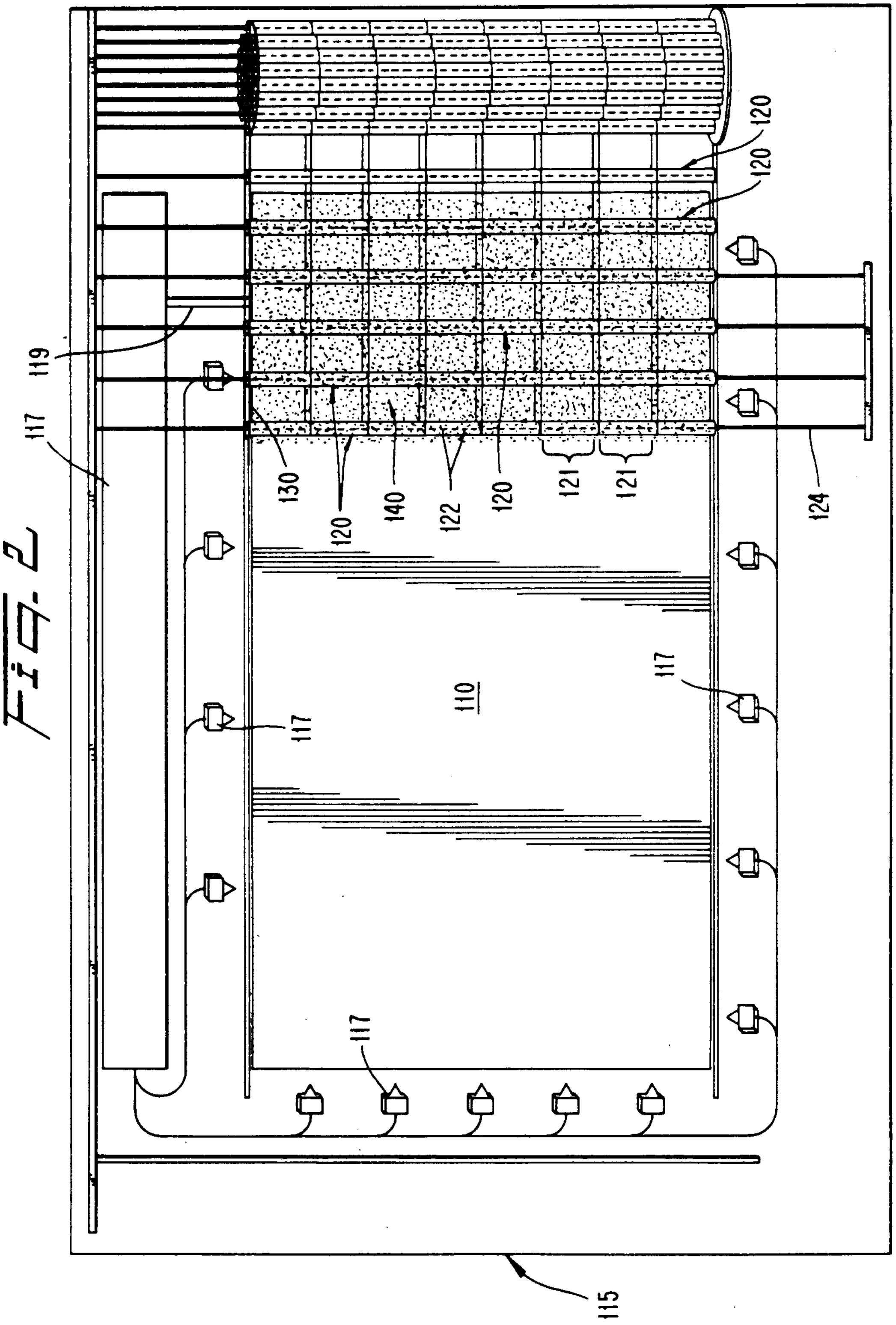
FIG. 2 is an expanded diagram of a screen-fogging apparatus according to the present invention.

FIG. 2 illustratively shows screen fogging means embodied as screen-fogging apparatus comprising a movie screen 110, means for generating a fog-like gas, marble frame 115, and a screen-fogging apparatus having a plurality of retractable shafts 120, means for spinning the shafts, chain drive 130, and axles 124. The means for generating a fog-like gas may be embodied as a fog generator 117. The means for spinning the shafts may be embodied as a chain drive 130 connected to the plurality of retractable shafts 120 and to a motor. The plurality of retractable shafts 120 have slits 122. The slits 122 may be long narrow cuts, round holes, or any other shaped aperture in the shafts 120. The plurality of retractable shafts 120 are mounted in front of the movie screen 110 and are coupled to fog generator 117. The chain drive 130 is coupled to the plurality of retractable shafts 120 for spinning the plurality of plurality of retractable shafts 120. The fog-like gas flows from the fog generator 117 through the plurality of retractable shafts 120 and escapes from the slits 122.

The plurality of shafts 120 are suspended from a chain drive 130 that can move clockwise or counter clockwise and allows the plurality of shafts 120 to continually advance in either direction across the screen 110 since the chain is a loop. As the screen fogging apparatus creates its special effects, the shafts 120 closest to the audience (in front) emit gases through the plurality of slits 122. The gas generator 117 has the capacity for generating gases of variable force, pressure or color. The shafts 120 closest to the screen 110 (in back) need not emit gases until they come around in front, thus creating a clear impression of swirling gases advancing in front and across the screen 110 in one direction. Control means is coupled to the means for spinning the shafts, to the fog generator 117 and to the chain drive for controlling the advance of the shafts 120 across the screen. The control means may be responsive to a master computer 160 which controls the enhanced cinema system and to the movie means.

The present invention can best be understood by the following disclosure of the operation of the cooperative elements of the claimed invention. Referring to FIG. 2, when an audience is sitting in a theater and waiting for a movie to start, all the audience will see is a thick, fog-like gas 140 slowly rolling across the screen. The fog-like gas 140 escapes from slits 122 of shafts 120. The shafts 120 are long and narrow, and may or may not be visible to the audience due to the fog-like gas 140. The fog-like gases 140 generate a wonderful magic effect.

Features of the screen-fogging apparatus of FIG. 2 include having the shafts 120 as hollow, spinning, retractable shafts with slits which allow the fog-like gases under pressure to escape. The shafts 120, can be modularly constructed to suit different screen sizes and dimensions for various theaters. Vertical adaptability is achieved by adding or subtracting shaft segments 121. Horizontal, screen width, adaptability is achieved by adding or hanging more complete shafts 120 to the chain drive loop. The present invention includes means for retracting he shafts 120. The retracting means includes appropriate equipment for retracting the shafts 120. The shafts can be retractable in one of two ways. The first, the shafts 120 can be connected to a chain drive 130, which also pulls the shafts 120 across the screen horizontally, as curtains are often pulled in a movie theater. Alternatively, the shafts 120 can retract either in an upward direction, or in a downward direction onto bars 124. The chain drive 130 while shown at the top of the movie cinema screen 110 can alternatively be located at the bottom of the movie screen 110 or any other convenient position for designing an effective means for spinning the shafts 120. The shafts 120 are spun to generate a rolling fog-like gas effect. The fog generator 117 can be any type of device which will generate a fog-like gas and can be connected to the shafts 120 via tubing 119.

The shafts 120 are made of strong, light weight materials, for example plastic. Also, the shafts 120 are very thin, and preferably are not visible to the audience because they are hidden by the thick gases being released from them.

The columns of retractable shafts 120 can be suspended from a continuous loop chain drive 130 that allows the columns of smoke to continually flow across the screen. Each of the shafts can be fed with a different color of gas, in a prearranged position. Thus, a plurality of colored gases may be used or alternatively three primary colors red, blue, and yellow, may be used which may mix to generate any desirable color in the proper ratios. The effect is that through controlling the gases released from the shafts 120 a very colorful gas effect can be generated.

Figure 3B:
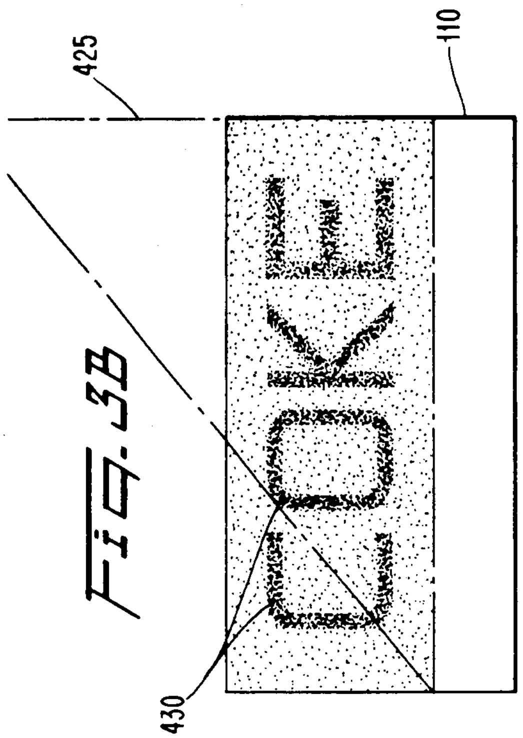
FIG. 3B is a second example of a laser beam interacting with a screen-fogging apparatus releasing color fog-like gas displaying words across a movie screen according to the present invention.
Figure 3A:
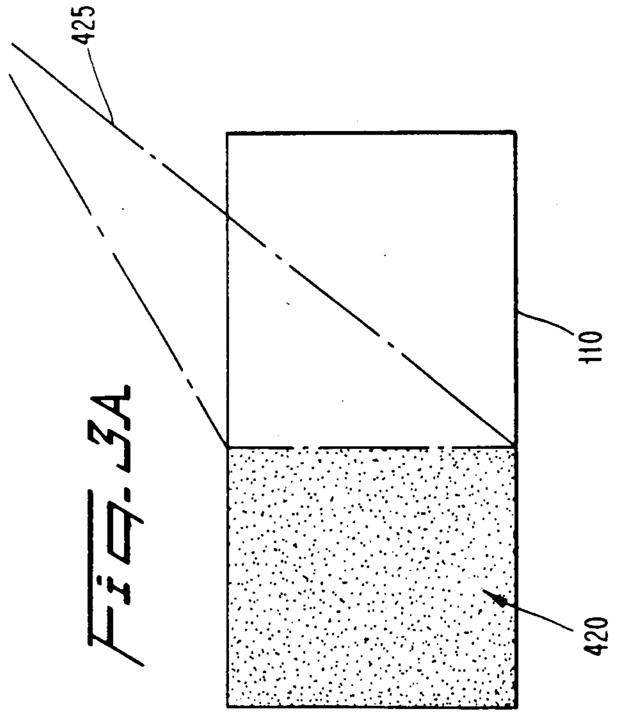
FIG. 3A is a first example of a laser beam interacting with the screen-fogging apparatus in front of the movie screen according to the present invention.

The basic screen fogging apparatus is shown in FIG. 3A. In this example, the laser light beam 425 appears to be a fan of light dispersing the fog-like gas 420 across the screen 110.

As shown in FIG. 3B, an enhanced model may include having the capability to produce advanced lettering effects from the gases. For example, the advanced lettering 430 as shown in FIG. 3B is produced by employing smaller shaft segments and having a greater number of them, and having different colored gases used to produce the desired lettering. In the example shown, two colors of fog-like gases would be used, one for the background and a second for the lettering. As the laser horizontal fan 425 crawls up the screen, it can create the illusion of making the the fog-like gas 430 roll up from the bottom of the screen.

Figure 3C:
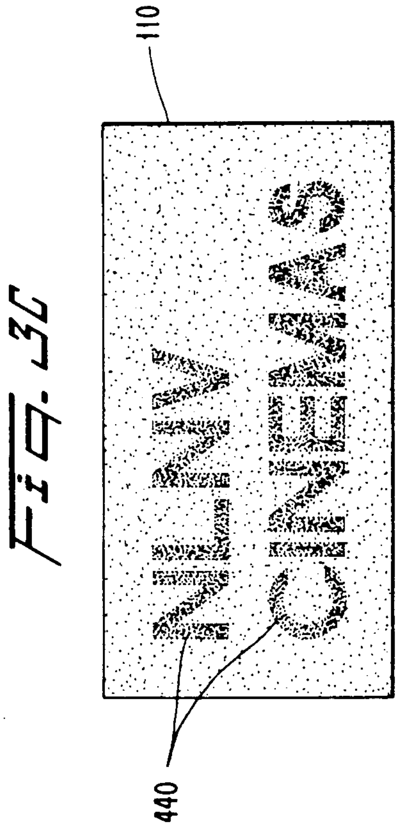
FIG. 3C is an example of a screen-fogging apparatus releasing color fog-like gas displaying words across a movie screen according to the present invention.

FIG. 3C shows an advanced system using a plurality of colored fog-like gases and a greater number of smaller shaft segments. In this example, the lettering 440 may be as fine and detailed as there is capacity for smaller shaft segments and multiple color gases. Again, the laser light beam 425 can appear to disperse the gases at the beginning of a show.

Figure 4:
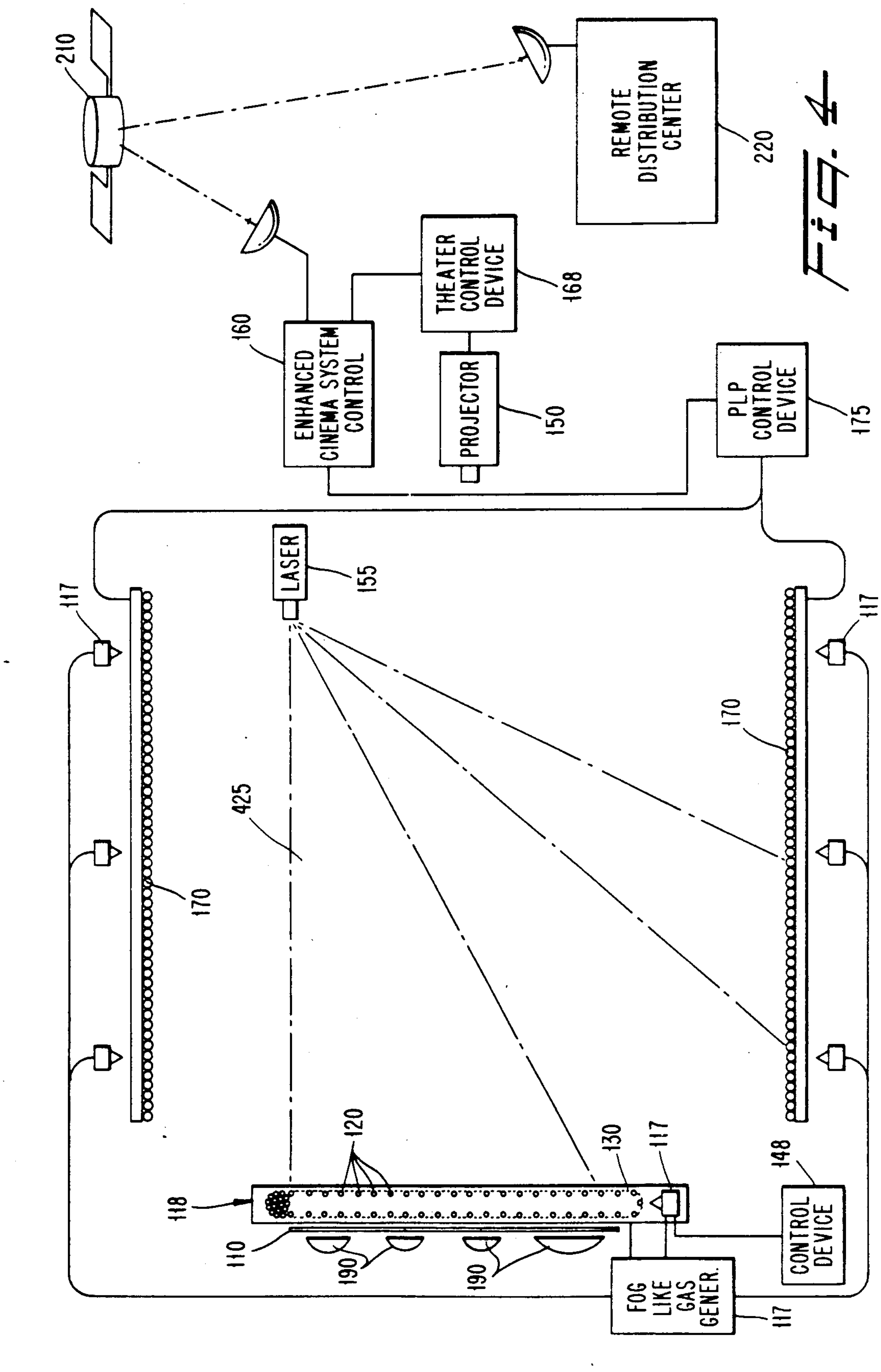
FIG. 4 is a diagram of an advanced cinema system employing a remote distribution system.

FIG. 4 exemplifies an advanced system approach of the present invention. As shown in FIG. 4, the movie screen 110 has behind it the conventional plurality of speakers 190. In front of the screen 110 is the housing for the screen-fogging apparatus 118. A control device 148 also is shown for controlling the speed and direction of the spinning shafts, the pace that the drive chain pulls the shafts and the variable release force of the fog-like gases from the plurality of shafts 120 and remote fog-emitting devices 117. A laser 155 is shown with light beams 425, 426 for special effects to interact with the screen-fogging apparatus 118 and the programmable lighting panels 170, respectively. Programmable lighting panels 170 are located on both sides of the theater and are coupled to a control device 175, and computer 160. The projector 150 is further coupled to a control device 168, and to an enhanced cinema system control 160. Additionally, a remote distribution center 220 is coupled to the computer control 160 via a communications channel which, in this exemplified diagram is a satellite 210. Although a satellite channel is shown, the communications channel may be a normal telephone channel or any other type of means for communicating between two points.

In the embodiment shown in FIG. 4, the laser beam from the laser 155 can interact with a product on the screen, for example, cartoons, trailers, feature films, advertisements, and any type of screen-fogging apparatus or programmable lighting panels 170. As mentioned, one effect is to have the laser beam to appear to raise or move the fog-like gas as a curtain would raise or move before a theater.

The programmable lighting panels 170 can be used for lighting and sound shows before, during or after the movie. For example, music being played before or after a feature film may have the programmable lighting panels "dancing to the music". Thus, the sound system can be timed with the programmable lighting panels. Also, the sound system can be timed with the laser beams striking the movie screen and the screen-fogging apparatus at different points, given the light beam power and a very dramatic effect. The interaction can further be used to add entertainment value to the movie viewer by having dramatic advertising effects with the movie theater audience. For example, an antilitter message can be dramatized or made entertaining by a person walking across the screen and drop garbage or litter in the theater, with the laser beam zapping the litter or person guilty of littering. The programmable lighting panels can also be used during the feature film. For example, an explosion shown on the movie screen could signal the programmable lighting panels to flare out from the screen and deep along the auditorium walls in synchronous timing to the explosion, hence bringing the dramatic action on the screen closer to and surrounding the movie viewers.

The theater control device 168 facilities the operation of the movie theater and the enhanced cinema system. This device includes the capability for synchronizing the interaction of the laser light beam, the programmable lighting panels and the screen fogging apparatus in conjunction with the running of the theater house lights and movies and other theater operating requirements.

The laser 155 can further include means for aiming the laser to appear on the screen at different points. This aiming means is controlled by the controller 168 or computer 160 in the system. The enhanced cinema system controller and the theater control device could be embodied as one device.

The remote control center 220 can be used to send special effects programming to various theaters throughout a geographical area. The special effects programming could be received, controlled and stored by the theater on computer, and shown in conjunction with a film at any time. Advanced special effects programming and broadcast technologies could eventually eliminate physical distribution of film prints and trailers or advertisements before theaters, by having them sent and controlled from one main area or from a few regional areas.

A key aspect of the present invention is using a laser light beam of theatrical quality to interact with what is being shown on the screen. While a film product, for example, a feature film, cartoon, short preview, or trailer, is being shown on the screen, the beam will strike the screen and appear to have affected what was going on at the time of the movie. The production of the movie product will take into account this interactive effect. An example is having the beam hitting a cartoon character and knocking him down, or having the beam zapping a spaceship and blowing it up. Since movies already have an abundance of things that are blown up, knocked over, tripped, pulverized, eradicated and dematerialized, the laser light beam may strike such activities that are already produced on the screen without thought of the present invention. The entertainment value of these movies will be enhanced for the movie public. The artistic potential of the invention will be magnified when films are produced with this invention in mind.

The programmable lighting panels would be specially designed and engineered lighting fixtures and lighting switching devices that cover the theater walls and are programmable to achieve a broad spectrum of lighting special effects and displays including laser light and sound shows. These displays or shows could occur before, during or after the movie is being shown. The programmable lighting panels could be programmed and activated locally or remotely. Remote programming and activation could be performed at facilities and broadcast via satellite to subscribing theaters. Transmission of program data could also occur via floppy disk or via computer modem or via any communication or broadcast means. Theater owners would have the means for programming new shows on site using control device 175 and computer 160. The control device 175 and computer 160 may be embodied as one device or computer.

The enhanced cinema system includes a specially designed frame 115 of FIG. 2 around the screen 110 which would invoke a timeless/futuristic impression for viewers. Features include but are not limited to having the frame around the movie screen 110 made of marble, having a rolling, thick fog-like colored gas move slowly across the screen in a controlled way using the retractable spinning shafts 120, or thin vaporous gases floating across or standing in front of the screen while colored light from a variety of angles passes through them from a side of the frame housing. The thin vaporous gases in front of the screen would be produced by injection of gases directly from the fog-like gas generating means without the gases having to pass through the retractable spinning shafts 120. As the movie begins, these gases are dispelled. The gases can appear to be dispelled as a laser beam from within the theater auditorium strikes the screen. The thick rolling gases are removed from in front of the screen by the retraction of the spinning shafts. Likewise, the thin vaporous gases are removed from in front of the screen by ventilation or blowing with fans.

The present invention includes the capability of having an artistic extension of the film with producers or lecturers discussing a movie. This concept is to have the movie audience view a discussion of the movie that allows them to see the movie newly, more alertly and appreciate it more. The discussion could be either filmed or videotaped or recorded on any other means for storing and playing back video and would be shown to theater patrons before or after the movie. Charging extra for the viewing could be left to local theater discretion.

The present invention has the advantage of being an educational method, when applied to the exhibition of motion pictures to the general public which employ super learning techniques. For example, the enhanced cinema system can be used for playing of classic or baroque music which has the effect of balancing the left or analytic portion of the human brain and the right or creative portion of the brain so as to achieve the maximum receptivity of the mind for learning purposes. The appropriate music would be an accompaniment to the light show produced by the programmable lighting panels. As the light and sound show portion of the program ends the theater could have a lecture begin. Thus, the light and sound show would "sneak" a mentally receptive and calming influence into the minds of the movie viewers before the lecture starts. This sequence would have what information or insights there are conveyed during the film lecture being absorbed to the maximum degree by the audience.

The advantage of the present invention is that this educational and learning method also employs an inducement to public acceptance of learning and appreciating art more since the entertainment aspects of the enhanced cinema system tend to sugarcoat the learning experience. Also, the educational method would serve as an effective means to advertise since the audience's mind is more receptive than it ordinarily would be and would be stimulated. At suitable times during the program, advertisements could be introduced in a number of ways, including projected on the screen by the laser beam interaction with the screen, or advertisements could be transmitted by the programmable lighting panels or the screen-fogging apparatus.

The educational methods and advantages of the present invention also employ a mild conditioning of the audience for the purpose of educational by alternating between entertainment and educational aspects of the system in a pattern that both simultaneously interests or fascinates the viewer and opens and balances their minds for information or artistic absorption.

The educational and learning method comprises three major categories of processes which individually and collectively may assume various embodiments, may be presented in a plurality of combinations and orders of sequence and may be presented between operations of the apparatuses of the invention in a multitude of ways including before or after the movie is shown to the public. These categories of processes include: 1) A light and sound show performed in the theater auditorium combining conventional laser, light and sound show artistry while embodying, applying, and adapting specific "superlearning" concepts described in the book *Superlearning* by S. Ostrander, L. Schroeder and N. Ostrander (New York, 1979); 2) A film lecture presentation conducted by a plurality of learned and articulate professionals both in and out of the movie industry business, e.g., movie producers, directors, actors, film scholars, professors, critics, psychologists, businessmen, educators and philosophers. The film lecture may be in person or via film, video, holographic projection or other media; 3) A structured process where audience members are asked questions and individuals from the audience voluntarily respond to the questions either silently by thinking their response or audibly by sharing or voicing their response to the audience at large or to select individuals in the audience.

It will be apparent to those skilled in the art that various modifications can be made to the enhanced cinema system of the instant invention without departing from the spirit or scope of the invention, and it is intended that the present invention cover modifications and variations of the enhanced cinema system provided they come within the scope of the appended claims and their equivalents.

I claim:

1. An enhanced cinema system comprising:

a movie screen;

means for generating a fog-like gas;

a plurality of retractable shafts mounted in front of said movie screen and coupled to said generating means, said plurality of retractable shafts having slits;

means coupled to said plurality of retractable shafts for spinning said plurality of retractable shafts, wherein the fog-like gas flows from said generating means through said plurality of retractable shafts and escapes from the slits of said plurality of retractable shafts;

movie means responsive to a movie film for generating an interact signal and a lighting signal, and for projecting a movie onto said movie screen;

means coupled to said movie means and responsive to the interact signal for generating a beam of light for interacting with the movie projected onto said movie screen;

programmable lighting panels having a plurality of lights; and control means coupled to said programmable lighting panels and said movie means, and responsive to the lighting signal, for activating the lights in said programmable lighting panels during the movie.

2. The enhanced cinema system as set forth in claim 1 further including means coupled to said plurality of retractable shafts for retracting said plurality of retractable shafts.

3. An enhanced cinema system comprising:

a movie screen;

means for generating a fog-like gas;

a plurality of shafts mounted in front of said movie screen and coupled to said generating means, said plurality of shafts having slits;

means coupled to said plurality of shafts for spinning said plurality of shafts; and wherein the fog-like gas flows from said generating means through said plurality of shafts and escapes from the silts of said plurality of shafts.

4. The enhanced cinema system as set forth in claim 3 further including means for retracing said shafts.

5. The enhanced cinema system as set forth in claim 3 further including means for generating a beam of light for interacting with the movie projected onto said movie screen.

6. An enhanced cinema system comprising:

a movie screen;

means for generating a fog-like gas;

shaft means mounted in front of said movie screen and coupled to said generating means, for spreading the fog-like gas across said movie screen;

means coupled to said shaft means for spinning said shaft means, wherein the fog-like gas flows from said generating means through said shaft means across said screen; and means for generating a beam of light for interacting with the fog-like gas in front of said movie screen.

7. An enhanced cinema system comprising:

a movie screen;

means for generating a plurality of fog-like gases having different colors;

a plurality of shafts mounted in front of said movie screen and coupled to said generating means, said plurality of shafts having slits, wherein the plurality of fog-like gases flows from said generating means through said plurality of shafts and escape from the slits of said plurality of shafts;

means coupled to said plurality of shafts for spinning said plurality of shafts; and means coupled to said plurality of shafts for controlling each of said plurality of gases for displaying a colored effect in front of said movie screen with the plurality of fog-like gases.

8. The enhanced cinema system as set forth in claim 7 further including means for retracing said plurality of shafts.

9. The enhanced cinema system as set forth in claim 7 further including means for generating a beam of light for interacting with the plurality of fog-like gasses in front of said movie screen.

10. An enhanced cinema system comprising:

a movie screen;

means for generating a plurality of fog-like gases having different colors;

shaft means mounted in front of said movie screen and coupled to said generating means, for spreading the fog-like gas across said movie screen, wherein the plurality of fog-like gases flow from said generating means through said shaft means across said movie screen;

means coupled to said plurality of shafts for controlling each of said plurality of gases for displaying a colored effect in front of said movie screen with the plurality of fog-like gases;

means coupled to said plurality of shafts for retracting said plurality of shafts; and means for generating a beam of light for interacting with the plurality of fog-like gases in front of said movie screen.

11. An enhanced cinema system comprising:

a movie screen;

means for generating a fog-like gas;

a plurality of shafts mounted in front of said movie screen and coupled to said generating means, said plurality of shafts having slits, wherein the fog-like gas flows from said generating means through said plurality of shafts and escapes from the slits of said plurality of shafts;

movie means responsive to a movie film for generating an interact signal and for projecting a movie through the fog-like gas and onto said movie screen; and means coupled to said movie means and responsive to the interact signal for generating a beam of light for interacting with the movie projected onto said movie screen.

12. The enhanced cinema system as set forth in claim 11 further including means for retracting said plurality of shafts.

13. The enhanced cinema system as set forth in claim 11 further including means coupled to said plurality of shafts for spinning said plurality of shafts.

14. The enhanced cinema system as set forth in claim 11 including means for generating a beam of light for interacting with the screen-fogging apparatus in front of said movie screen.

15. The enhanced cinema system as set forth in claim 11 further including programmable lighting panels and means of beam of light for interacting with said programmable lighting panels.

16. An enhanced cinema system comprising:

a stage;

means for generating a fog-like gas;

shaft means mounted in front of said stage and coupled to said generating means, for spreading the fog-like gas across said stage;

means coupled to said plurality of shafts for retracting said plurality of shafts; and means for generating a beam of light for interacting with the fog-like gas in front of said stage.

17. An enhanced cinema system comprising:

a movie screen;

means for generating a fog-like gas;

shaft means mounted in front of said movie screen and coupled to said generating means, for spreading the fog-like gas across said movie screen;

means coupled to said plurality of shafts for spinning said plurality of shafts, wherein the fog-like gas flows from said generating means through said shaft means across said screen;

movie means responsive to a movie film for generating an interact signal and for projecting a movie through the fog-like gas and onto said movie screen; and means coupled to said movie means and responsive to the interact signal for generating a beam of light for interacting with the movie projected onto said movie screen.

18. An enhanced cinema system comprising:

a movie screen;

movie means responsive to a movie film for generating a lighting signal, and for projecting a movie onto said movie screen;

a plurality of shafts mounted in front of said movie screen for spreading a fog-like gas across said screen;

means for spinning said shafts;

programmable lighting panels having a plurality of lights; and control means coupled to said programmable lighting panels and said movie means, and responsive to the lighting signal, for activating the lights in said programmable lighting panels during the movie.

19. An enhanced cinema system comprising:

a movie screen;

means for generating a fog-like gas;

shaft means mounted in front of said movie screen and coupled to said generating means, for spreading the fog-like gas across said movie screen;

means coupled to said plurality of shafts for spinning said plurality of shafts, wherein the fog-like gas flows from said generating means through said shaft means across said screen;

means for generating a beam of light for interacting with said spreading means in front of said movie screen;

movie means responsive to a movie film for generating a lighting signal, and for projecting a movie onto said movie screen;

programmable lighting panels having a plurality of lights; and control means coupled to said programmable lighting panels and said movie means, and responsive to the lighting signal, for activating the lights in said programmable lighting panels during the movie.

20. An enhanced cinema distribution system comprising:

a movie screen;

movie means responsive to a movie film for generating a lighting signal, and for projecting a movie onto said movie screen;

a plurality of shafts mounted in front of said movie screen for spreading a fog-like gas across said screen;

means for retracting said shafts;

programmable lighting panels having a plurality of lights; and control means coupled to said programmable lighting panels and said movie means, and responsive to the lighting signal, for activating the lights in said programmable lighting panels during the movie.

21. An enhanced cinema system comprising:

a movie screen;

means for generating a fog-like gas;

a plurality of shafts mounted in front of said movie screen and coupled to said generating means, said plurality of shafts having slits;

means for retracting said plurality of shafts; and wherein the fog-like gas flows from said generating means through said plurality of shafts and escapes from the slits of said plurality of shafts.

22. The enhanced cinema system as set forth in claim 21 further including means coupled to said plurality of shafts for spinning said plurality of shafts.

23. An enhanced cinema system comprising:

a stage;

means for generating a plurality of fog-like gases having different colors;

shaft means mounted in front of said stage and coupled to said generating means, for spreading the fog-like gas across said stage, wherein the plurality of fog-like gases flow from said generating means through said shaft means in front of said stage;

means coupled to said plurality of shafts for controlling each of said plurality of gases for displaying a colored effect in front of said stage with the plurality of fog-like gases;

means coupled to said plurality of shafts for retracting said plurality of shafts; and means for generating a beam of light for interacting with the plurality of fog-like gases in front of said stage.

24. An enhanced cinema system comprising:

a movie screen;

means for generating a fog-like gas;

shaft means mounted in front of said movie screen and coupled to said generating means, for spreading the fog-like gas across said movie screen;

means coupled to said plurality of shafts for retracting said plurality of shafts; and means for generating a beam of light for interacting with the fog-like gas in front of said movie screen.

25. The enhanced cinema system as set forth in claim 24 further including means coupled to said plurality of shafts for spinning said plurality of shafts.

26. An enhanced cinema distribution system comprising:

a movie screen;

movie means responsive to a movie film for generating a lighting signal, and for projecting a movie onto said movie screen;

a plurality of shafts mounted in front of said movie screen for spreading a fog-like gas across said screen;

means for spinning said shafts;

programmable lighting panels having a plurality of lights; and control means coupled to said programmable lighting panels and said movie means, and responsive to the lighting signal, for activating the lights in said programmable lighting panels during the movie.

27. An enhanced cinema system comprising:

a stage;

means for generating a fog-like gas;

a plurality of shafts mounted in front of said stage and coupled to said generating means, said plurality of shafts having slits;

means coupled to said plurality of shafts for spinning said plurality of shafts; and wherein the fog-like gas flows from said generating means through said plurality of shafts and escapes from the slits of said plurality of shafts.

28. The enhanced cinema system as set forth in claim 27 further including means for retracting said shafts.

29. The enhanced cinema system as set forth in claim 27 further including means for generating a beam of light for interacting with actors and scenery on said stage.

30. An enhanced cinema system comprising:

a stage;

means for generating a fog-like gas;

shaft means mounted in front of said stage and coupled to said generating means, for spreading the fog-like gas in front of said stage;

means coupled to said shaft means for spinning said shaft means, wherein the fog-like gas flows from said generating means through said shaft means in front of said stage; and means for generating a beam of light for interacting with the fog-like gas in front of said stage.

31. An enhanced cinema system comprising:

a stage;

means for generating a plurality of fog-like gases having different colors;

a plurality of shafts mounted in font of said stage and coupled to said generating means, said plurality of shafts having slits, wherein the plurality of fog-like gases flows from said generating means through said plurality of shafts and escape from the slits of said plurality of shafts;

means coupled to said plurality of shafts for spinning said plurality of shafts; and means coupled to said plurality of shafts for controlling each of said plurality of gases for displaying a colored effect in front of said movie screen with the plurality of fog-like gases.

32. The enhanced cinema system as set forth in claim 31 further including means for retracting said plurality of shafts.

33. The enhanced cinema system as set forth in claim 32 further including means for generating a beam of light for interacting with actors and scenery on siad stage, with the plurality of fog-like gases in front of said stage.

34. An enhanced cinema system comprising:

a stage;

means for generating a fog-like gas;

a plurality of shafts mounted in front of said stage and coupled to said generating means, said plurality of shafts having slits;

means for retracting said plurality of shafts; and wherein the fog-like gas flows from said generating means through said plurality of shafts and escapes from the slits of said plurality of shafts.

35. The enhanced cinema system as set forth in claim 34 further including means coupled to said plurality of shafts for spinning said plurality of shafts.

* * * * *